(12) United States Patent
Schubring et al.

(10) Patent No.: US 7,553,077 B2
(45) Date of Patent: Jun. 30, 2009

(54) SYSTEMS AND METHODS FOR DETERMINING A TEMPERATURE OF A FERROELECTRIC SENSOR

(75) Inventors: Norman W. Schubring, Troy, MI (US); Michael W. Putty, Grosse Pointe Woods, MI (US); Joseph V. Mantese, Manchester, CT (US); Adolph L. Micheli, Harrison Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 189 days.

(21) Appl. No.: 11/761,110

(22) Filed: Jun. 11, 2007
(Under 37 CFR 1.47)

(65) Prior Publication Data
US 2008/0304545 A1  Dec. 11, 2008

(51) Int. Cl.
*G01K 7/36* (2006.01)
(52) U.S. Cl. ............... 374/177; 250/338.3; 374/E7.039
(58) Field of Classification Search ................. 374/177; 250/338.3, 338.2
See application file for complete search history.

(56) References Cited

U.S. PATENT DOCUMENTS

| 4,348,611 A | * | 9/1982 | Ruppel et al. | ............... 313/388 |
|---|---|---|---|---|
| 5,254,504 A | * | 10/1993 | Van der Spiegel et al. | ...... 438/3 |
| 6,339,221 B1 | * | 1/2002 | Schubring et al. | ........ 250/338.3 |
| 2006/0163482 A1 | | 7/2006 | Mantese et al. | |
| 2006/0180759 A1 | | 8/2006 | Mantese et al. | |
| 2006/0181479 A1 | | 8/2006 | Mantese et al. | |

OTHER PUBLICATIONS

U.S. Appl. No. 11/758,776, filed Jun. 6, 2007, Title: System and Method for Determining a Change of Temperature of a SBT Pixel Element.
U.S. Appl. No. 11/682,974, filed Mar. 7, 2007, Title: Low-Fire Ferroelectric Material.
U.S. Appl. No. 11/671,662, filed Feb. 6, 2007, Title: Infrared Sensors and Methods for Manufacturing the Infrared Sensors.

* cited by examiner

*Primary Examiner*—Andre J Allen
(74) *Attorney, Agent, or Firm*—Paul L. Marshall

(57) ABSTRACT

Systems and methods for determining a temperature of a ferroelectric sensor are provided. The ferroelectric sensor has operational characteristics defined by a polarization versus voltage hysteresis loop. In one exemplary embodiment, the method includes applying a symmetrical periodic voltage waveform to the ferroelectric sensor so as to induce the ferroelectric sensor to traverse the polarization versus voltage hysteresis loop. The method further includes monitoring voltages across the ferroelectric sensor and polarization states of the ferroelectric sensor over a first time interval to determine a first zero field polarization state and a first coercive field voltage. The method further includes determining a first temperature value indicative of the temperature of the ferroelectric sensor based on the first coercive field voltage.

8 Claims, 6 Drawing Sheets

SYSTEMS AND METHODS FOR DETERMINING A TEMPERATURE OF A FERROELECTRIC SENSOR

BACKGROUND

This application relates to systems and methods for determining a temperature of a ferroelectric sensor.

Ferroelectric sensors have been utilized to monitor infrared energy being emitted from an environment. During operation, a change in a polarization state of a ferroelectric sensor has been utilized to determine a temperature change in the ferroelectric sensor. However, a drawback with the ferroelectric sensor is that a change in the polarization state for a given temperature change of the ferroelectric sensor is relatively small which can result in undesirable temperature measurement errors.

Accordingly, the inventors herein have recognized a need for improved systems and methods for measuring a temperature of a ferroelectric sensor that utilizes a coercive field value of the ferroelectric sensor to determine the temperature of the ferroelectric sensor.

SUMMARY

A method for determining a temperature of a ferroelectric sensor in accordance with an exemplary embodiment is provided. The ferroelectric sensor has operational characteristics defined by a polarization versus voltage hysteresis loop. The method includes applying a symmetrical periodic voltage waveform to the ferroelectric sensor so as to induce the ferroelectric sensor to traverse the polarization versus voltage hysteresis loop. The method further includes monitoring voltages across the ferroelectric sensor and polarization states of the ferroelectric sensor over a first time interval to determine a first zero field polarization state and a first coercive field voltage. The method further includes determining a first temperature value indicative of the temperature of the ferroelectric sensor based on the first coercive field voltage.

A system for determining a temperature of a ferroelectric sensor in accordance with another exemplary embodiment is provided. The ferroelectric sensor has operational characteristics defined by a polarization versus voltage hysteresis loop. The system includes a voltage source configured to apply a symmetrical periodic voltage waveform to the ferroelectric sensor so as to induce the ferroelectric sensor to traverse the polarization versus voltage hysteresis loop. The system further includes a controller configured to monitor voltages across the ferroelectric sensor and polarization states of the ferroelectric sensor over a first time interval to determine a first zero field polarization state and a first coercive field voltage. The controller is further configured to determine a first temperature value indicative of the temperature of the ferroelectric sensor based on the first coercive field voltage.

A method for determining a temperature of a ferroelectric sensor in accordance with another exemplary embodiment is provided. The ferroelectric sensor has operational characteristics defined by first and second polarization versus voltage hysteresis loops. The method includes applying a symmetrical periodic voltage waveform to the ferroelectric sensor so as to induce the ferroelectric sensor to traverse the first and second polarization versus voltage hysteresis loops. The method further includes monitoring voltages across the ferroelectric sensor and polarization states of the ferroelectric sensor during a first traversal of the first polarization versus voltage hysteresis loop. The method further includes determining a first area of the first polarization versus voltage hysteresis loop based on the monitored voltages and polarization states during the first traversal of the first polarization versus voltage hysteresis loop. The method further includes determining a first temperature value indicative of the temperature of the ferroelectric sensor based on the first area of the first polarization versus voltage hysteresis loop.

A system for determining a temperature of a ferroelectric sensor in accordance with another exemplary embodiment is provided. The ferroelectric sensor having operational characteristics defined by first and second polarization versus voltage hysteresis loops. The system includes a voltage source configured to apply a symmetrical periodic voltage waveform to the ferroelectric sensor so as to induce the ferroelectric sensor to traverse the first and second polarization versus voltage hysteresis loops. The system further includes a controller configured to monitor voltages across the ferroelectric sensor and polarization states of the ferroelectric sensor during a first traversal of the first polarization versus voltage hysteresis loop. The controller is further configured to determine a first area of the first polarization versus voltage hysteresis loop based on the monitored voltages and polarization states during the first traversal of the first polarization versus voltage hysteresis loop. The controller is further configured to determine a first temperature value indicative of the temperature of the ferroelectric sensor based on the first area of the first polarization versus voltage hysteresis loop.

DETAILED DESCRIPTION OF EXEMPLARY EMBODIMENTS

Figure 1:
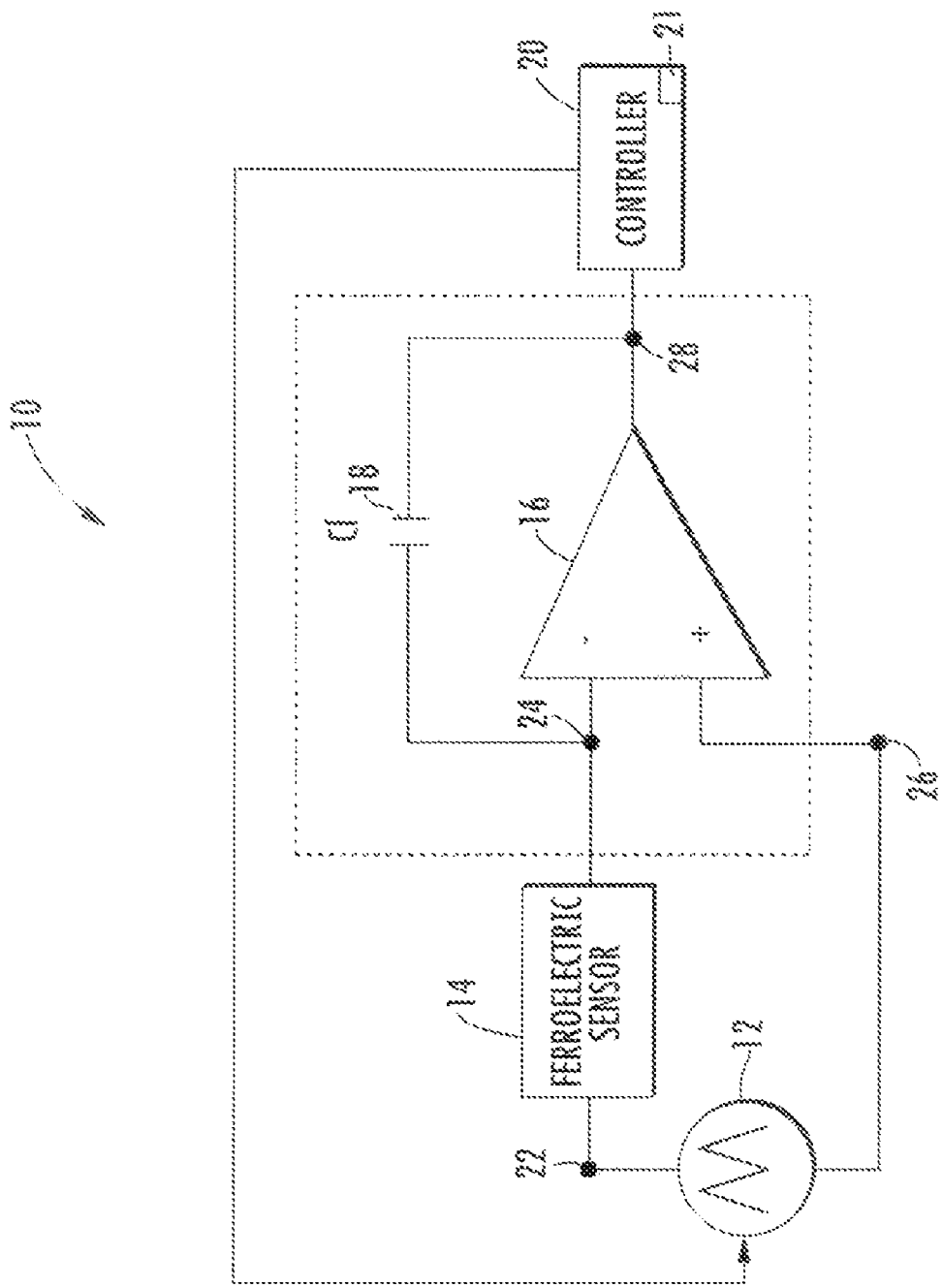
FIG. 1 is a schematic of a system for determining a temperature of a ferroelectric sensor in accordance with an exemplary embodiment.

Referring to FIG. 1, a system 10 for determining a temperature of a ferroelectric sensor 14 is illustrated. The system 10 includes a voltage source 12, the ferroelectric sensor 14, an operational amplifier 16, a capacitor 18, and a controller 20.

Figure 3:
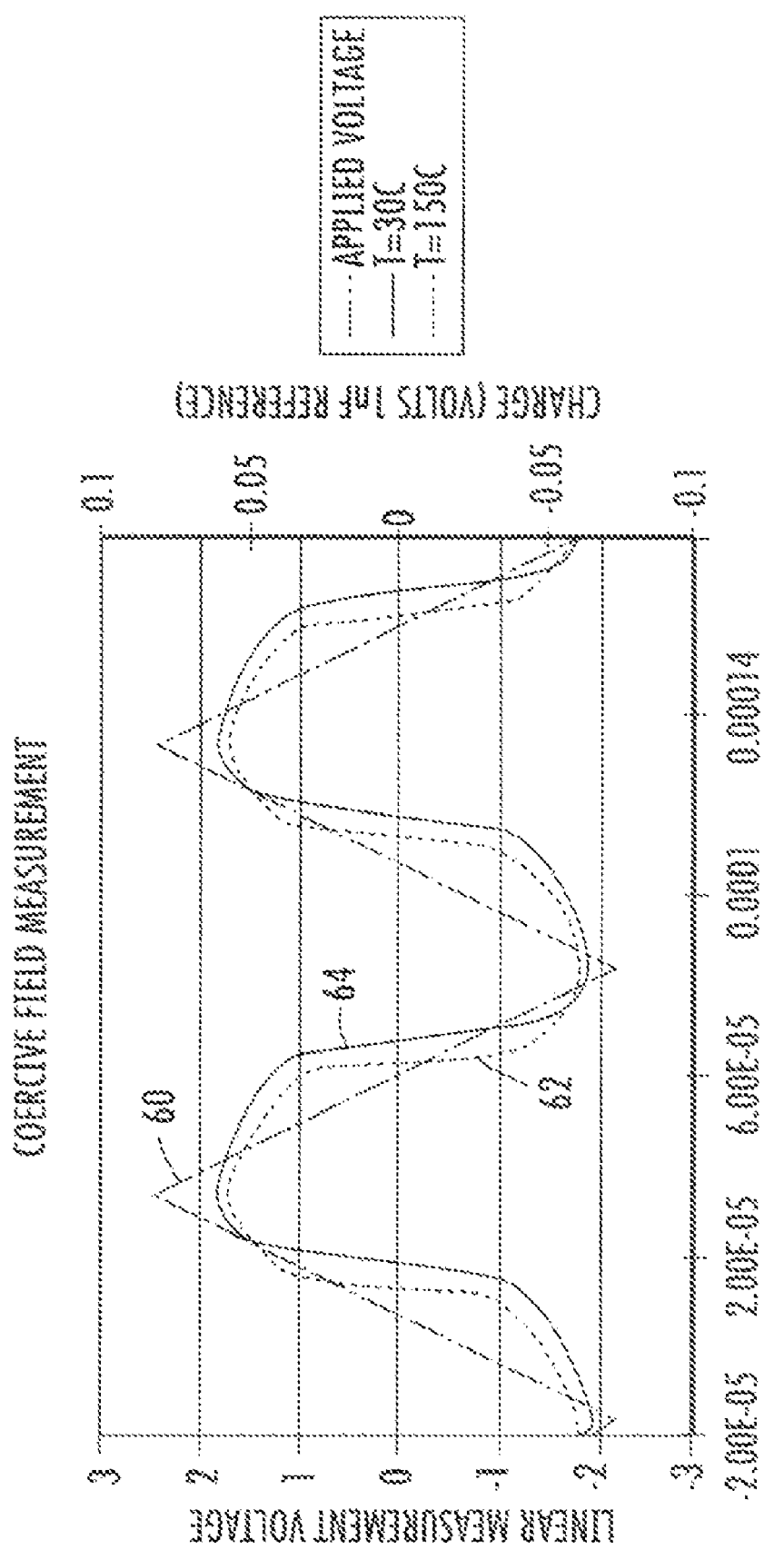
FIG. 3 is a schematic of signal curves indicative of signals generated by the system of FIG. 1.

The voltage source 12 is provided to apply a symmetrical periodic voltage waveform to the ferroelectric sensor 14. Referring to FIG. 3, in one exemplary embodiment, the voltage source 12 applies a triangular-shaped periodic voltage waveform, illustrated by the curve 60, to the ferroelectric sensor 14. Of course in alternative embodiments, other symmetrical periodic voltage waveforms known to those skilled in the art could be applied by the voltage source 12 to the ferroelectric sensor 14. For example, a sinusoidal waveform or a pulse width modulated waveform could be output by the voltage source 12. The voltage source 12 is electrically coupled to the ferroelectric sensor 14 and to the controller 20.

Referring to FIG. 1, the ferroelectric sensor 14 is provided to generate a signal indicative of a temperature of the ferroelectric sensor 14. In one exemplary embodiment, the ferroelectric sensor 14 is constructed from strontium bismuth tantalate (SBT). Of course, in alternative embodiments, the ferroelectric sensor 14 can be constructed from other ferroelectric materials known to those skilled in the art. The ferroelectric sensor 14 is electrically coupled between the voltage source 12 at a node 22 and an inverting terminal of the operational amplifier 16 at a node 24.

The operational amplifier 16 is provided to amplify a signal generated by the ferroelectric sensor 14. The inverting terminal of the amplifier 16 is electrically coupled to an output terminal of the ferroelectric sensor 14. The non-inverting terminal of the amplifier 16 is electrically coupled to the voltage source 12. An output terminal of the amplifier 16 is electrically coupled to the controller 20 at a node 28. The capacitor 18 is electrically coupled between the node 24 and a node 28. The capacitor 18 is provided to store a charge generated by the ferroelectric sensor 14.

The controller 20 is provided to determine a temperature of the ferroelectric sensor 14 based upon received signals at the node 28, and the voltage generated by the voltage source 12. The controller 20 is electrically coupled to an output terminal of the amplifier 16 and to the voltage source 12. The operation of the controller 20 will be explained in further detail below.

Figure 2:
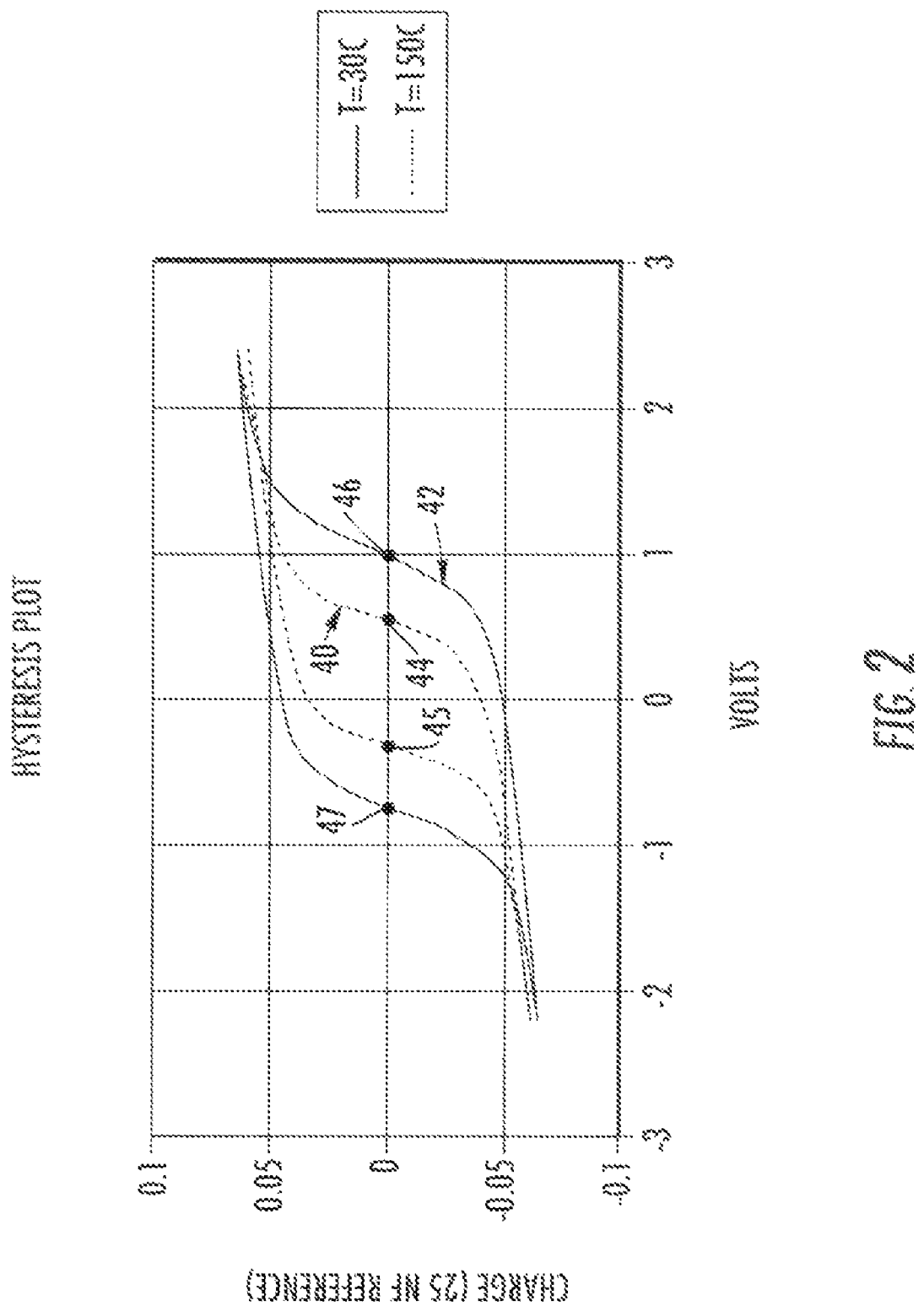
FIG. 2 is a schematic of a pair of polarization versus voltage hysteresis loop curves associated with the ferroelectric sensor of FIG. 1.

Before providing a detailed explanation of the functionality of the system 10, a brief overview of the theory of operation of the system 10 will be provided. Referring to FIG. 2, a polarization versus voltage hysteresis loop curve 40 associated with the ferroelectric sensor 14 when the sensor 14 has a temperature of 150 degrees Celsius is provided. The X-axis of the curve 40 corresponds to voltage levels that can be applied to the ferroelectric sensor 14. As shown in curve 40, the voltage levels are varied between +2.2 volts and approximately −2.2 volts. The Y-axis of the curve 40 corresponds to electrical charge levels of the capacitor 18 as the voltage levels are varied across the ferroelectric sensor 14. The points 44 and 45 on the curve 40 correspond to coercive field voltages (on X-axis) at zero field polarization states (on Y-axis). In this example, the coercive field voltages are approximately 0.5 volts and −0.5 volts. When the voltage is increased from the coercive field voltage at point 44, a polarization state of the ferroelectric sensor 14 switches to a positive polarization state. Alternately, when the voltage is decreased from the voltage at point 45, the polarization state of the ferroelectric sensor switches to a negative polarization state.

The polarization versus voltage hysteresis loop curve 42 associated with the ferroelectric sensor 14 when the sensor 14 has a temperature of 30 degrees Celsius is provided. The X-axis of the curve 150 corresponds to voltage levels that can be applied the ferroelectric sensor 14. As shown in curve 42, the voltage levels are varied between +2.2 volts and approximately −2.2 volts. The Y-axis of the curve 42 corresponds to electrical charge levels of the capacitor 18 as the voltage levels are varied across the ferroelectric sensor 14. The points 46 and 47 on the curve 42 correspond to coercive field voltages (on X-axis) at zero field polarization states (on Y-axis). In this example, the coercive field voltages are approximately 1.0 volts and −0.8 volts. When the voltage is increased from the coercive field voltage at point 46, a polarization state of the ferroelectric sensor 14 switches to a positive polarization state. Alternately, when the voltage is decreased from the voltage at point 47, the polarization state of the ferroelectric sensor switches to a negative polarization state.

Referring to curves 40, 42 in FIG. 2, the inventors herein have recognized that the coercive field voltages at points 44, 46 are indicative of a temperature of the ferroelectric sensor 14. Further, the inventors herein have recognized that a change in the coercive field voltages (e.g., from point 44 to point 46) is indicative of a change in temperature of the ferroelectric sensor 14. The inventors herein have further recognized that areas enclosed by the curves 40, 42 are indicative of temperatures of the ferroelectric sensor 14. Further, the inventors herein have recognized that a change in the area of the curves 40, 42 is indicative of a change in the temperature of the ferroelectric sensor 14.

Referring to FIG. 3, curves 62, 64 indicate a change and polarization state of the capacitor 18 as a signal illustrated by curve 60 is applied to the ferroelectric sensor 14 at temperatures of 150 degrees Celsius and 30 degrees Celsius, respectively.

Figure 4:
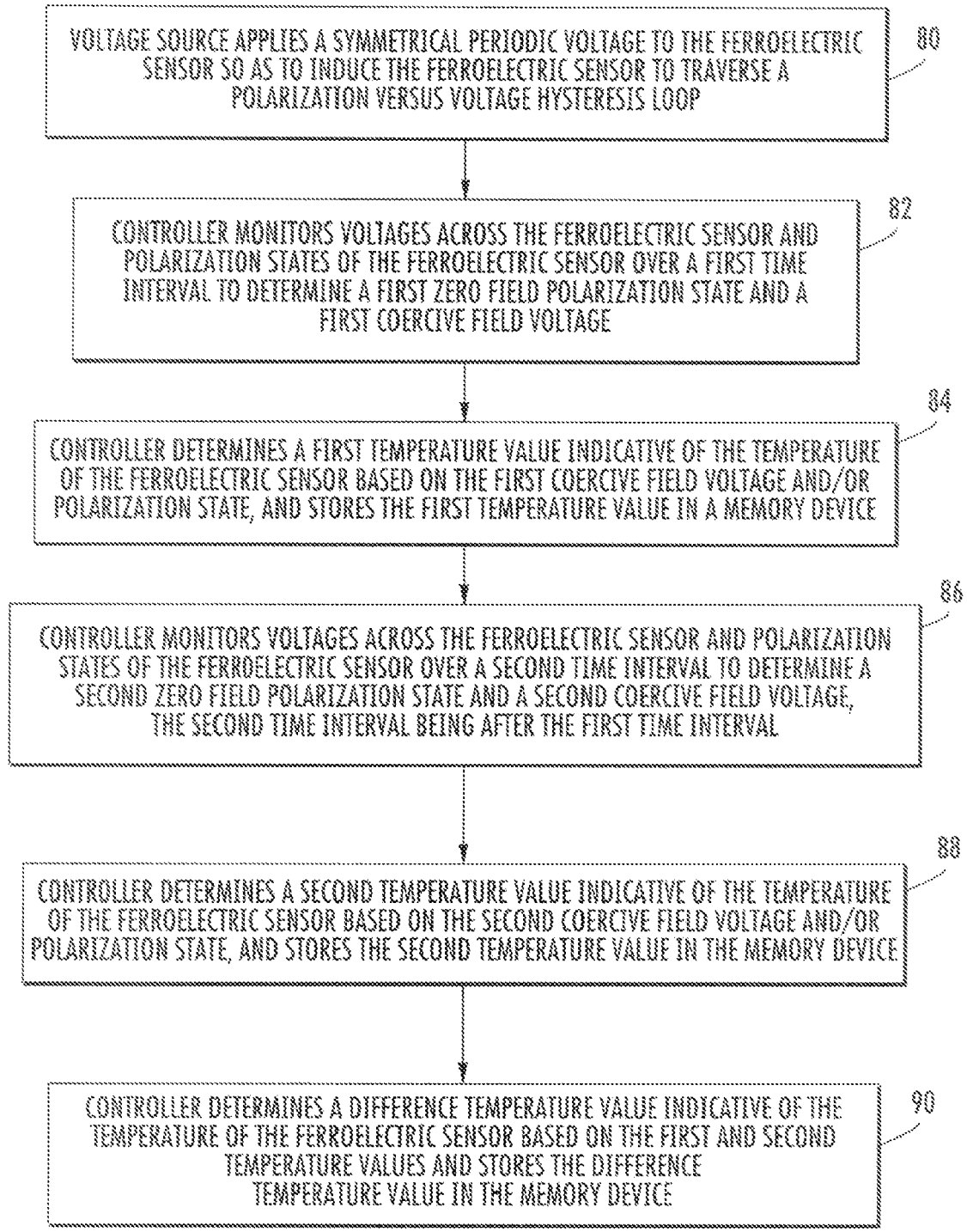
FIG. 4 is a flowchart of a method for determining a temperature of a ferroelectric sensor in accordance with another exemplary embodiment.

Referring to FIG. 4, a flowchart of a method for determining a temperature of the ferroelectric sensor 14 in accordance with another exemplary embodiment will now be explained.

At step 80, the voltage source 12 applies a symmetrical periodic voltage waveform to the ferroelectric sensor 14 so as to induce the ferroelectric sensor 14 to traverse a polarization versus voltage hysteresis loop associated with the ferroelectric sensor 14.

At step 82, the controller 20 monitors voltages across the ferroelectric sensor 14 and polarization states of the ferroelectric sensor 14 over a first time interval to determine a first zero field polarization state and a first coercive field voltage. It should be noted that an amount of electrical charge in the capacitor 18 is indicative of polarization state of the ferroelectric sensor 14.

At step 84, the controller 20 determines a first temperature value indicative of the temperature of the ferroelectric sensor 14 based on the first coercive field voltage and/or polarization state, and stores the first temperature value in a memory device 21.

At step 86, the controller 20 monitors voltages across the ferroelectric sensor 14 and polarization states of the ferroelectric sensor 14 over a second time interval to determine a second zero field polarization state and a second coercive field voltage. The second time interval is after the first time interval.

At step 88, the controller 20 determines a second temperature value indicative of the temperature of the ferroelectric sensor 14 based on the second coercive field voltage and/or polarization state, stores the second temperature value in the memory device 21.

At step 90, the controller 20 determines a difference temperature value indicative of the temperature of the ferroelectric sensor 14 based on the first and second temperature values and stores the difference temperature value in the memory device 21.

Figure 5:
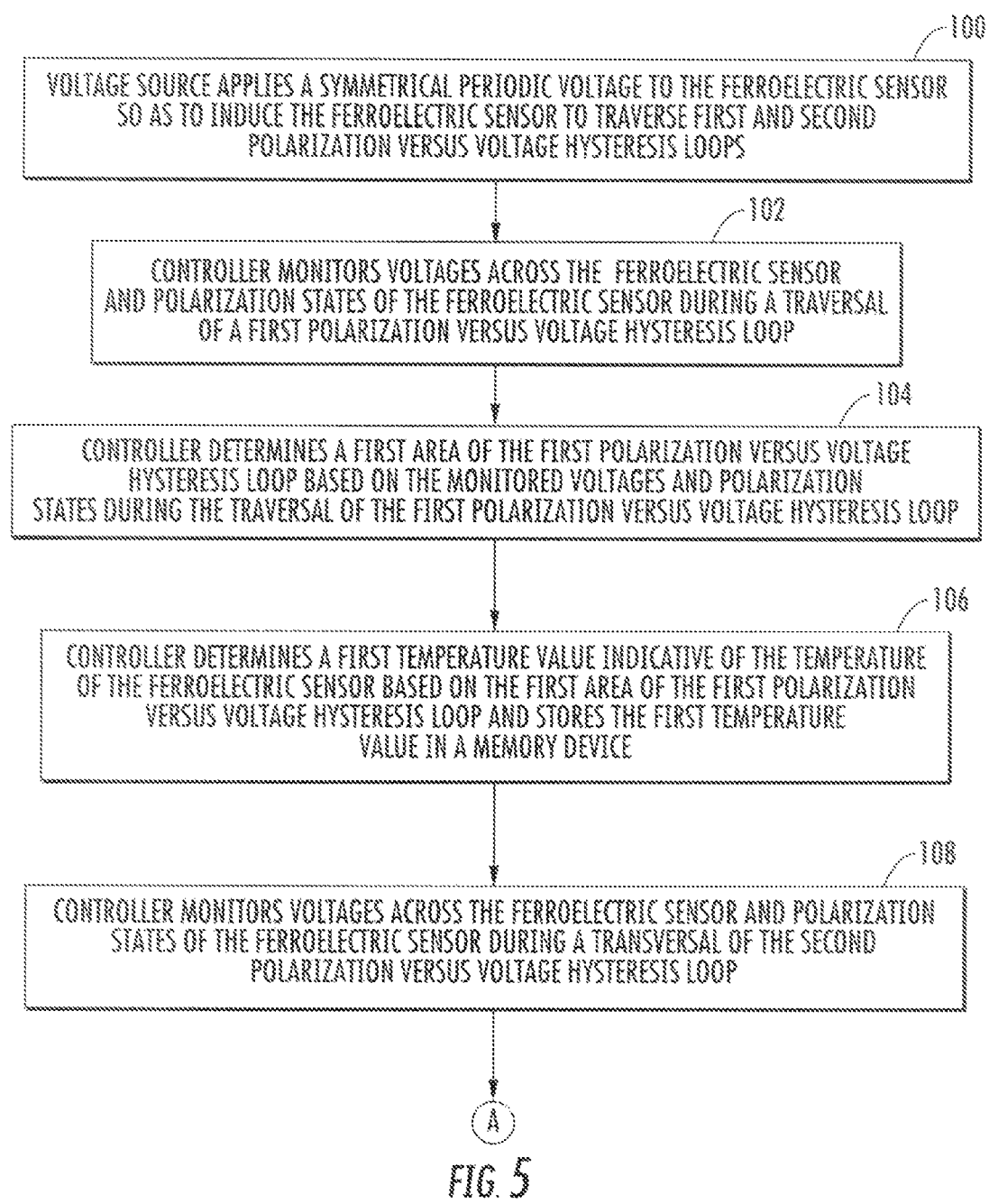
FIGS. 5-6 are flowcharts of a method for determining a temperature of a ferroelectric sensor in accordance with another exemplary embodiment.
Figure 6:
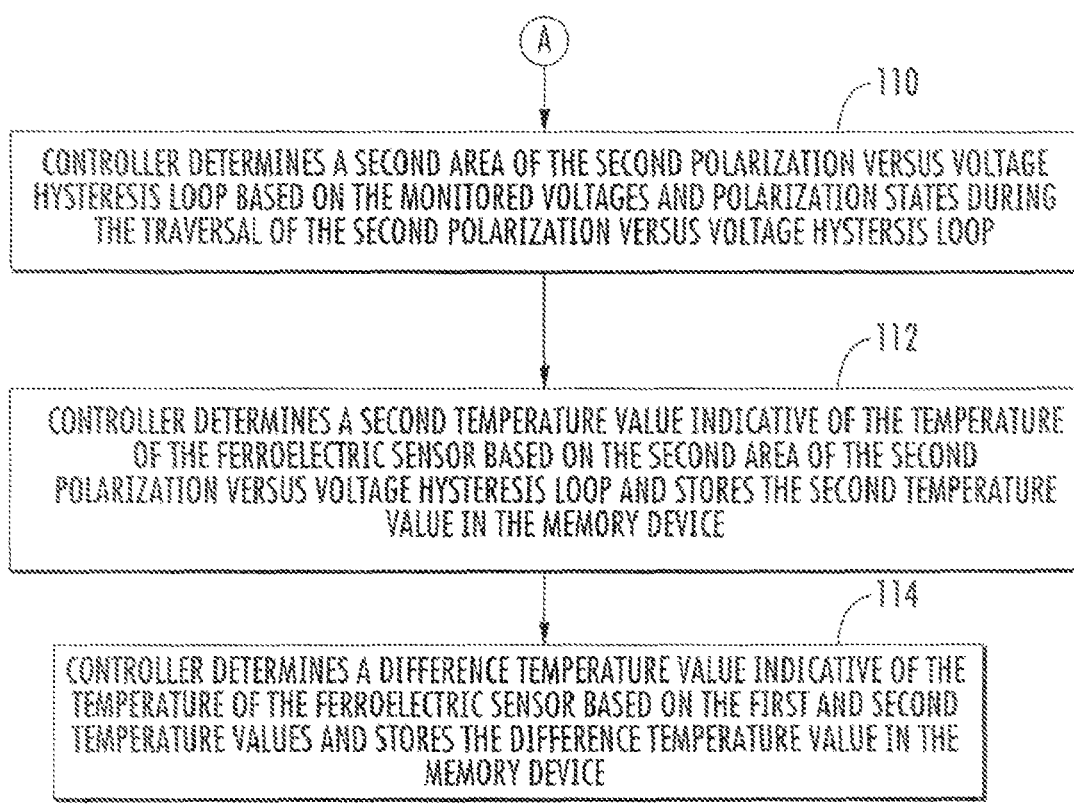

Referring to FIGS. 5 and 6, a flowchart of a method for determining a temperature of the ferroelectric sensor 14 in accordance with another exemplary embodiment will now be explained.

At step 100, the voltage source 12 applies a symmetrical periodic voltage waveform to the ferroelectric sensor 14 so as to induce the ferroelectric sensor 14 to traverse first and second polarization versus voltage hysteresis loops associated with the ferroelectric sensor 14.

At step 102, the controller 20 monitors voltages across the ferroelectric sensor 14 and polarization states of the ferroelectric sensor 14 during a traversal of a first polarization versus voltage hysteresis loop.

At step 104, the controller 20 determines a first area of the first polarization versus voltage hysteresis loop based on the monitored voltages and polarization states during the traversal of the first polarization versus voltage hysteresis loop.

At step 106, controller 20 determines a first temperature value indicative of the temperature of the ferroelectric sensor 14 based on the first area of the first polarization versus voltage hysteresis loop and stores the first temperature value in the memory device 21.

At step 108, the controller 20 monitors voltages across the ferroelectric sensor 14 and polarization states of the ferroelectric sensor 14 during the traversal of the second polarization versus voltage hysteresis loop.

At step 110, the controller 20 determines a second area of the second polarization versus voltage hysteresis loop based on the monitored voltages and polarization states during the traversal of the second polarization versus voltage hysteresis loop.

At step 112, the controller 20 determines a second temperature value indicative of the temperature of the ferroelectric sensor 14 based on the second area of the second polarization versus voltage hysteresis loop and stores the second temperature value in the memory device 21.

At step 114, the controller 20 determines a difference temperature value indicative of the temperature of the ferroelectric sensor 14 based on the first and second temperature values and stores the difference temperature value in the memory device 21.

The systems and methods for determining a temperature of the ferroelectric sensor provide a substantial advantage over other systems and methods. In particular, the systems and methods provide a technical effect of determining a temperature of the ferroelectric center based upon a coercive field voltage, which provides a more accurate measurement of the temperature of the ferroelectric sensor.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Furthermore, the use of the terms a, an, etc. do not denote a limitation of quantity, but rather denote the presence of at least one of the referenced items.

What is claimed is:

1. A method for determining a temperature of a ferroelectric sensor, the ferroelectric sensor having operational characteristics defined by a polarization versus voltage hysteresis loop, the method comprising:

applying a symmetrical periodic voltage waveform to the ferroelectric sensor so as to induce the ferroelectric sensor to traverse the polarization versus voltage hysteresis loop;

monitoring voltages across the ferroelectric sensor and polarization states of the ferroelectric sensor over a first time interval to determine a first zero field polarization state and a first coercive field voltage; and determining a first temperature value indicative of the temperature of the ferroelectric sensor based on the first coercive field voltage.

2. The method of claim 1, further comprising:

monitoring voltages across the ferroelectric sensor and polarization states of the ferroelectric sensor over a second time interval to determine a second zero polarization state and a second coercive field voltage, the second time interval being after the first time interval; and determining a second temperature value indicative of the temperature of the ferroelectric sensor based on the second coercive field voltage; and determining a difference temperature value indicative of the temperature of the ferroelectric sensor based on the first and second temperature values.

3. The method of claim 1, further comprising storing the first temperature value in a memory device.

4. A system for determining a temperature of a ferroelectric sensor, the ferroelectric sensor having operational characteristics defined by a polarization versus voltage hysteresis loop, the system comprising:

a voltage source configured to apply a symmetrical periodic voltage waveform to the ferroelectric sensor so as to induce the ferroelectric sensor to traverse toe polarization versus voltage hysteresis loop;

a controller configured to monitor voltages across the ferroelectric sensor and polarization states of the ferroelectric sensor over a first time interval to determine a first zero field polarization state and a first coercive field voltage; and the controller further configured to determine a first temperature value indicative of the temperature of the ferroelectric sensor based on the first coercive field voltage.

5. A method for determining a temperature of a ferroelectric sensor, the ferroelectric sensor having operational characteristics defined by first and second polarization versus voltage hysteresis loops, the method comprising:

applying a symmetrical periodic voltage waveform to the first and second ferroelectric sensor so as to induce the ferroelectric sensor to traverse the polarization versus voltage hysteresis loops;

monitoring voltages across the ferroelectric sensor and polarization states of the ferroelectric sensor during a traversal of the first polarization versus voltage hysteresis loop;

determining a first area of the first polarization versus voltage hysteresis loop based on the monitored voltages and polarization states during the traversal of the first polarization versus voltage hysteresis loop; and determining a first temperature value indicative of the temperature of the ferroelectric sensor based on the first area of the first polarization versus voltage hysteresis loop.

6. The method of claim 5, further comprising:

monitoring voltages across the ferroelectric sensor and polarization states of the ferroelectric sensor during a traversal of the second polarization versus voltage hysteresis loop;

determining a second area of the second polarization versus voltage hysteresis loop based on the monitored voltages and polarization states during the traversal of the second polarization versus voltage hysteresis loop; and determining a second temperature value indicative of the temperature of the ferroelectric sensor based on the second area of the second polarization versus voltage hysteresis loop; and determining a difference temperature value indicative of the temperature of the ferroelectric sensor based on the first and second temperature values.

7. The method of claim 5, further comprising storing the first temperature value in a memory device.

8. A system for determining a temperature of a ferroelectric sensor, the ferroelectric sensor having operational characteristics defined by first and second polarization versus voltage hysteresis loops, the system comprising:

a voltage source configured to apply a symmetrical periodic voltage waveform to the ferroelectric sensor so as to induce the ferroelectric sensor to traverse the first and second polarization versus voltage hysteresis loops;

a controller configured to monitor voltages across the ferroelectric sensor and polarization states of the ferroelectric sensor during a traversal of the first polarization versus voltage hysteresis loop;

the controller further configured to determine a first area of the first polarization versus voltage hysteresis loop based on the monitored voltages and polarization states during the traversal of the first polarization versus voltage hysteresis loop; and the controller further configured to determine a first temperature value indicative of the temperature of the ferroelectric sensor based on the first area of the first polarization versus voltage hysteresis loop.

* * * * *